Feb. 25, 1969   E. PLUMAT   3,429,684
GLASS MELTING FURNACE WITH VACUUM FEED MEANS
Filed May 18, 1967   Sheet __1__ of 2

INVENTOR
EMILE PLUMAT

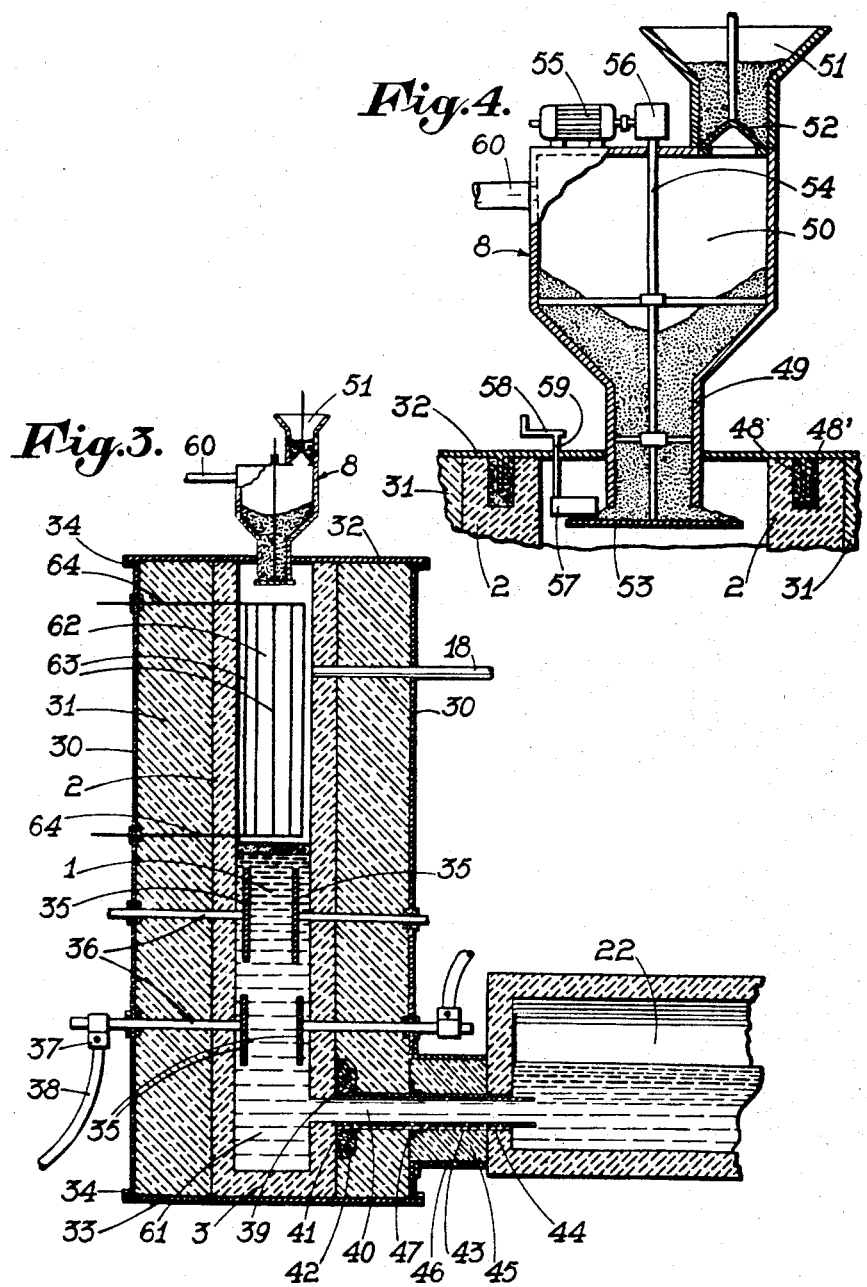

United States Patent Office 3,429,684
Patented Feb. 25, 1969

3,429,684
GLASS MELTING FURNACE WITH
VACUUM FEED MEANS
Emile Plumat, Gilly, Belgium, assignor to Glaverbel,
Brussels, Belgium, a Belgian company
Continuation-in-part of application Ser. No. 253,791,
Jan. 25, 1963. This application May 18, 1967, Ser.
No. 657,433
U.S. Cl. 65—335                                                          2 Claims
Int. Cl. C03b 3/00

ABSTRACT OF THE DISCLOSURE

This invention is directed to a furnace and continuous process for melting and refining glass in which glass raw materials are fed at subatmospheric pressure into the upper portion of a melting chamber, are then both melted and refined in the chamber at a temperature less than that normally required to effect refining of the molten glass in the absence of reduced pressure at the upper portion of the melting chamber and then the refined molten glass is continuously passed from the bottom of the chamber laterally through a duct into a withdrawal compartment maintained at or about atmospheric pressure.

---

This application is a continuation-in-part of application Ser. No. 253,791, filed Jan. 25, 1963, now abandoned, and bearing the same title as this application.

The present invention relates to a process and to a furnace for the melting and the elaboration of vitreous products such as glass. Although the invention is hereinafter described as regards its application to the manufacture of glass, it also relates to the melting and the elaboration of other similar products.

It is known that the furnaces operated at high temperatures require highly elaborated refractories, for example of the electro-cast type. The main object of refractory walls is to resist the heat and the corrosion of the molten glass. The maintaining of the walls of refractory material in a good condition is obtained by tolerating a heat loss through walls which are generally not heat-insulated, except at some suitably chosen positions. Furthermore, it is usual practice to increase this heat discharge by cooling the blocks of refractory material disposed in line with the level of the molten glass. The numerous openings for the passage of burners, the composition and measuring instruments further increase the heat losses.

In order to avoid these very considerable heat losses, it has been proposed to introduce the energy source into the actual mass of molten glass. These furnaces, of the electrical furnace type, for example, reduce the losses, but the temperatures to be used for the melting operation are the same as in the case of furnaces where the energy is supplied by a source disposed externally of the molten glass bath. The heat loss per unit of surface of the walls of refractory material remains substantially equal in both cases.

Regardless of the method of heating used for glass furnaces, the said furnaces generally comprise three separate zones. The melting of the initial materials is carried out in the first zone, where they are brought to a temperature required for the second zone, known as the refining zone, towards which the molten mass is forwarded. The vitrification reactions must be completed in this zone, and above all also the physical homogenization of the mass and the discharge of the occluded gases which are not capable of being dissolved in the mass must be effected. In order to be able to escape, these gases must ascend to the surface of the molten glass. With the object of facilitating these operations, the mass must be very liquid, and thus it must be at a very high temperature, above that required for the melting of the composition, and substantially higher than the temperature suitable for the withdrawal and the shaping of the glass. The third zone serves essentially for regulating and thermally homogenising the molten glass and in fact for a supervised and controlled cooling so that at the points of withdrawal, the entire molten glass mass is exactly at the required temperature.

Although the glass elaborated in these furnaces is of an appreciable quality, while being capable of being improved, it is readily understood that the thermal balance of these furnaces is not fully satisfactory, since enormous masses comprising, on the one hand, the masses of initial materials and of molten glass travelling in the different zones and, on the other hand, those of the materials forming the masonry of the very large furnaces, must be brought to very high temperatures which are not necessary either for the melting of the initial materials or for the shaping of the elaborated glass. These very high temperatures require the use of special refractory materials, as already set forth, which themselves are stressed to the extreme limit of their possibilities, so that it is necessary deliberately to accept heat losses by reverberation in order to be able to extend their effective life with industrially acceptable delays.

When these furnaces, for example, are used for the production of a lime soda glass having the following chemical composition:

|  | Percent |
|---|---|
| $SiO_2$ | 72.5 |
| $Al_2O_3$ | 1.5 |
| $Na_2O$ | 14.0 |
| $MgO$ | 4.0 |
| $CaO$ | 8.0 |
|  | 100.0 | the melting temperature of this glass is about 1400° C., and to carry out refining of the molten glass the temperature must be raised to 1550° C., after which is must be lowered to 1000° C. in the conditioning compartment for the withdrawal of the glass.

The process according to the invention reduces these disadvantages to a very great degree. On the one hand, the process makes it possible for the very high temperatures to be reduced to lower temperatures, which considerably prolongs the effective life of the refractory materials of less high quality and, on the other hand, the process permits of reducing the volume of the furnaces and the quantity of molten glass circulating therein. Typically, in accordance with this invention, the same lime soda glass mentioned above requires only a temperature of about 1250° C. for both the melting and the refining of the glass while the temperature in the conditioning compartment is lowered to 1000° C. Thus, on a comparative basis this invention requires 300° C. less heat to effect melting and refining of the glass and requires 300° C. less cooling prior to withdrawal from the conditioning compartment.

To this end, according to the invention, a pressure drop is set up at the actual position where the melting of the initial materials is carried out, so that the degasification of the products being elaborated is substantially achieved during and immediately after the melting of these materials. Thus, the materials are from the outset freed from the interstitial air forming a barrier to the heat exchangers, the contact between the particles of material is improved and the melting is operated at much lower temperatures. In addition, the discharge of the gases released by the reactions between the constituents of the initial materials is promoted by the reduction in pressure, even if, at the reduced temperature at which the melting is carried out, the fluidity of the mass is less than in the conventional furnaces at the moment of passing from the melting zone to the refining zone.

The gases remaining in the molten glass when the latter is under the effect of the reduced pressure are absorbed and dissolved in the mass as the latter reaches the lower layers in which the reduced pressure or vacuum decreases gradually in order to give way to atmospheric pressure and to the pressure of a column of molten glass, the surface of which is under atmospheric pressure, as will be seen from the following.

On leaving the melting zone, the glass is thus practically degasified, and in the furnace for carrying out the process according to the invention, there is no longer any reason for the existence of the refining zone and the capacity of the heat-regulation zone can conveniently be reduced with respect to that of the corresponding zone of the conventional furnaces. The result is a considerable reduction of the volume of the furnace and an appreciable decrease in the energy required.

A furnace for melting and elaborating vitreous or other products in accordance with the process defined by the invention comprises a gas-tight chamber which is connected to a device creating a vacuum and surmounted by a loading member, provided with heating means and a lateral discharge duct for bringing the elaborated products into the bottom of a withdrawal compartment. According to one particular embodiment of the invention, the lower part of the chamber constitutes the hearth and is surmounted by a part in the form of a column in which the initial materials meet the hot gases issuing from the molten materials.

The loading or charging member for the initial materials comprises a gas-tight lock chamber and may advantageously be provided with a measuring member. In order to reduce the quantity of air introduced into the chamber under vacuum by the operation of the lock-chamber, the interior of the latter is preferably connected to a device which is capable of setting up therein a vacuum of a value similar to that maintained in the chamber. This device is set in operation before communication is established between the lock-chamber and the said chamber; it enables the vacuum obtaining in the said chamber to be kept constant and has the additional advantage of exhausting the dust which is in the initial materials. The gas-tight walls of the chamber advantageously comprise one or more layers of heat-refractory materials and one or more layers of heat-insualting materials, as well as one or more layers which ensure the gas-tightness. These latter are preferably disposed between the layers of heat-refractory materials and heat-insulating materials, and may be formed by a metallic envelope possibly capable of forming the support of the heat-insulating materials, or of one or more layers of gas-tight mortar applied to the refractory materials. In certain cases especially when the heat-insulating materials are not capable of allowing passage to air or another gas which can penetrate into the chamber under the effect of the vacuum obtaining therein, the layer or layers providing the gas-tightness can with advantage be disposed outside the walls of the chamber. The possibility of heat-insulating these walls and of making them gas-tight without subjecting the heat-refractory materials to excessive thermal stresses, is an advantageous consequence of lowering the temperature required for the melting of the initial materials.

The means for heating the furnace are preferably selected from those which do not produce appreciable quantities of gas. To this end, an electrical heating system is the one most suggested. The latter may comprise electrodes dipping into the molten materials, and/or electrical resistances. These latter may be enclosed in the molten materials and other resistances may be disposed above these latter in order to expose the initial materials to heat as soon as they enter the melting chamber. The resistances may also be partially immersed in the molten materials and in this case extend from top to bottom of the chamber.

The lateral duct or passage for evacuating into the bottom of a withdrawal compartment the molten products elaborated in the chamber under vacuum may be formed of refractory materials similar to those of the walls of the furnace. It is advantageously formed of a tube consisting of a metal resistant to the corrosion of these products. This tube may be provided at its upstream end with a flange which can be bonded with a gas-tight composition to the external face of the wall of the chamber consisting of heat-refractory material and be enclosed by a casing of a diameter substantially larger than that of the tube, the space between the latter and the casing being filled with heat-insulating material which avoids an excessive cooling of the products elaborated during their passage through the discharge duct.

The device creating the vacuum is a vacuum pump of sufficient power to maintain a constant considerable vacuum in the melting chamber. It exhausts the gases released during the fusion of the initial materials and the elaboration of the product. Before reaching the pump, these gases travel through a cooling means and possibly also a dust extractor. This latter may be made unnecessary by an appropriate conditioning of the initial materials, avoiding the presence of fine particles capable of being entrained by the released gases.

The vacuum obtaining in the melting chamber obviously causes the level of the molten materials in this chamber to rise above the levels of the molten products which are in the withdrawal tank under a pressure that may be atmospheric or somewhat above or below atmospheric. Regardless of the actual pressure on the molten glass in the withdrawal tank, it is important that a substantial pressure differential be maintained between that pressure and the vacuum in the melting chamber. A column of molten materials is formed in the chamber, in which column the vacuum decreases as the level existing in the withdrawal tank is approached.

Several embodiments of the invention are shown by way of example in the accompanying drawing.

FIGURE 3 is a vertical section of another embodiment of the invention, and

FIGURE 4 is a vertical section, to a larger scale, showing a furnace-loading device.

Figure 1:
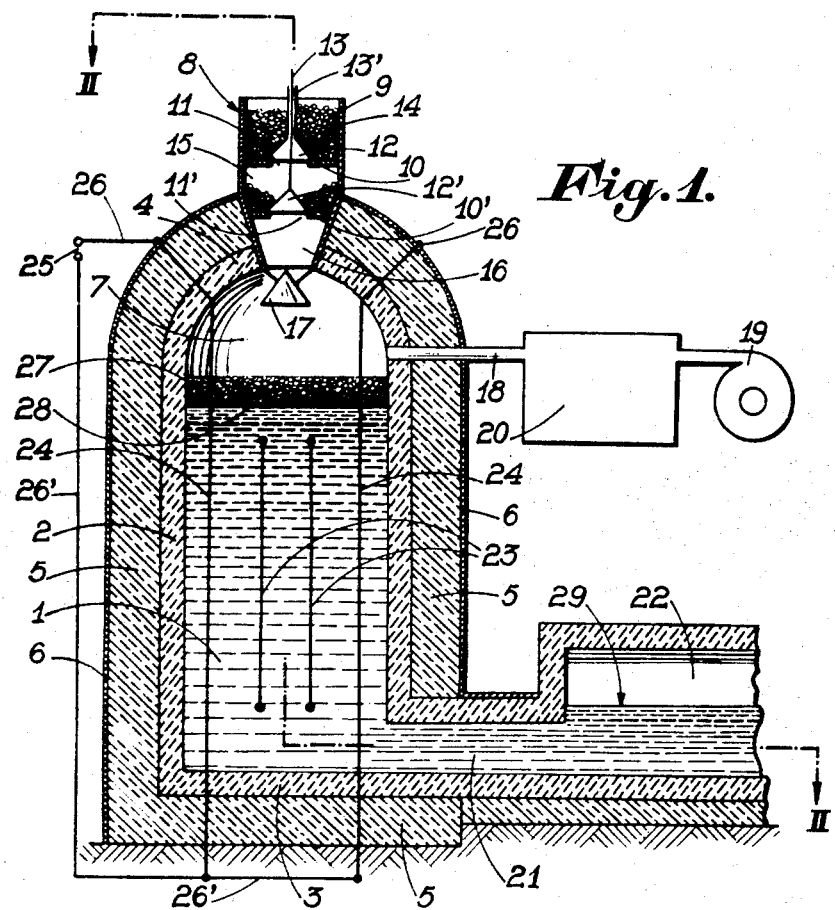
FIGURE 1 is a vertical section on the line I—I of FIGURE 2.
Figure 2:
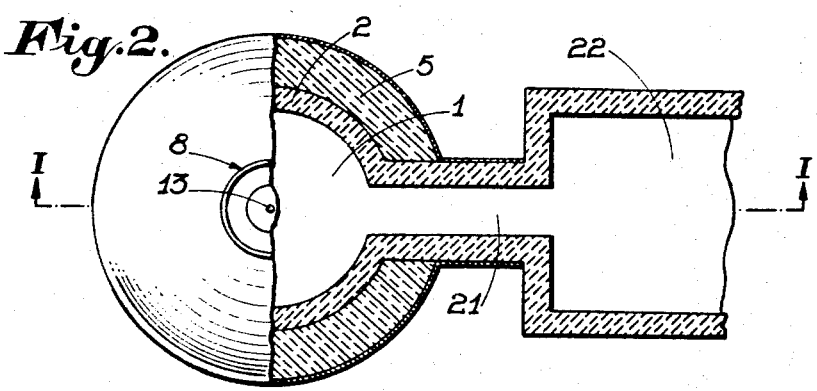
FIGURE 2 is a section on the line II—II of FIGURE 1, showing a first embodiment of a furnace according to the invention.

In the embodiment according to FIGURES 1 and 2, the furnace comprises a chamber 1 defined by a lateral wall 2, a base 3 and an arch 4 of refractory material. The walls 2, 3 and 4 are covered with a layer 5 of heat-insulating material. The tightness of the furnace is ensured by deposition of a gas-tight mortar on the external surface 6 of the furnace.

Located at the upper part of the cupola 7 formed by the arch 4 is the furnace-loading apparatus 8, which comprises a sheet metal plate 9 forming the external wall of this apparatus and provided with two partitions 10 and 10'. Each of these partitions 10 and 10' has a central opening 11 and 11' capable of being closed by a cover 12 and 12'. The position of the covers 12 and 12' is regulated by two coaxial rods 13 and 13'. The partitions 10 and 10' separate the apparatus 8 into three parts: the upper part 14, the central part or lock-chamber 15 and the lower part 16 communicating with the chamber. Arranged below the apparatus 8 is a distribution cone 17.

Opening into the lower part of the cupola 7 is a pipe 18 connecting the chamber 1 to a vacuum pump 19.

Arranged on the pipe 18 is a cooling device 20 which also serves as a moisture separator for the gases.

A lateral duct 21 for the evacuation of the molten products connects the base of the chamber 1 to a conditioning tank 22.

The chamber 1 is provided with electrical resistances 23 and 24 formed by wires or rods of a material resistant to corrosion by the molten materials, such as platinum, tungsten or molybdenum. The resistances 23 are completely immersed in the molten materials, while the resistance 24 partially emerge therefrom. The resistances are connected to the terminals 25 of an electric current source by distribution conductors 26 and 26'.

During the operation of the furnace, the resistances 23 and 24 are brought to high temperature by the flow of current and give off their heat to the molten materials contained in the chamber 1. The pump 19 exhausts the gases contained in the cupola 7 and, as a consequence, maintains therein a pressure lower than atmospheric pressure, this pressure being as low as possible. The vitrifiable materials are poured into the hopper 14 of the loading apparatus 8. By raising the cover 12, the vitrifiable materials are caused to enter the lock-chamber 15, from whence they can pass into the compartment 16 and then into the chamber 1 by raising the cover 12' after having lowered the cover 12. The movement of the covers is effected by the rods 13 and 13' connected to control members (not shown). The vitrifiable materials are distributed over the section of the furnace by the cover 17 and fall so as to form a layer 27 at the surface 28 of the molten materials contained in the chamber 1. Because of the reduced pressure obtaining in the cupola 7, the level 28 of the molten materials in the chamber 1 is substantially higher than that of the level 29 in the tank 22. The vitrifiable materials melt progressively in contact with the molten materials and a corresponding quantity of molten material is discharged through the duct 21 towards the tank 22, from whence the material is withdrawn for working operations.

It is possible to use only resistances 23 in the mass of molten materials, but it is frequently advantageous to employ the resistances 24, which heat the molten materials and also the layer 27 of vitrifiable materials. This layer is thus prevented from forming an arch by it melting only at certain places.

FIGURE 3 shows another embodiment of the invention. The chamber 1 of the furnace is formed by a wall 2 and a base 3 of refractory material. The external side wall of the furnace is formed by a casing 30; the space between this casing and the wall 2 is filled with heat-insulating material 31. The furnace is closed at its upper and lower ends by metal plates 32 and 33 fixed to the casing 30. The connections 34 between the plates 32 and 33, on the one hand, and the casing 30 on the other hand, are provided by fluid-tight joints consisting for example of lead or asbestos.

The furnace is provided with electrodes 35 fixed to conductors 36 which extend through the lateral walls and are connected by sockets 37 to the supply cables 38. Opening into the upper part of the furnace is a pipe 18 which connects the furnace to a vacuum pump, which is not shown but is similar to that shown in FIGURE 1.

Towards the bottom of the chamber, an opening 39 is formed in the refractory wall 2, against which is disposed the flange 41 of a tube 40 and fixed by means of a gas-tight composition 42. The tube 40 is made of a metal which is resistant to the action of the molten products, for example platinum, molybdenum or tungsten. The tube protected on the outside by a layer of glass 43 extends into the tank 22 through an orifice 44. A layer 45 of insulating material surrounding the tube 40 between the furnace and the tank 22 is kept in position by a casing 46, and a fluid-tight joint 47 may also be provided between the tube 40 and the casing 30.

The upper part of the furnace and the charging apparatus 8 are shown to a larger scale in FIGURE 4. The plate 32 is provided with a circular rib 48 engaging in a groove 48' which is formed in the wall 2 and filled with a joint-forming composition. Fixed to the plate 32 is the charging apparatus 8, which comprises a metal casing 49 forming the lock-chamber 50. hTis latter has arranged thereabove a hopper 51 with a closure cover 52. At the bottom end, the lock-chamber is provided with a measuring plate 53, which is supported and set in rotation by a shaft 54 driven by a motor 55 through a speed reduction gear 56. The measuring plate comprises a deflecting blade 57, the position of which is regulated by means of the crank 58 and the shaft 59. Finally, the lock-chamber is connected by a pipe 60 to a vacuum pump, which is not shown in the drawing.

The operation of this furnace is similar to that of the preceding furnace in principle. However, it differs therefrom in certain features which arise particularly from the substantially greater height of the chamber 1, so that one part only is filled with molten material and forms the crucible 61 and that the upper part, of considerable height, forms a column 62. The vitrifiable materials delivered by the charging apparatus 8 encounter in this column the hot gases released by the materials being melted and are heated at the expense of these gases, the result being a substantial saving of heat. The column 62 may however be used for the pre-heating of the initial materials by means of electrical resistances 63, disposed between the supply rods 64 extending through the wall of the chamber.

The vitrifiable materials supply the furnace continuously by rotation of the plate 53 combined with the action of the deflector device 57. The rate of flow of the materials delivered into the furnace is regulated either by altering the speed of rotation of the measuring plate 53, or by adjusting the position of the deflector 57 by the crank 58. In addition, a preliminary extraction of gas from the initial materials is caused by creating in the lock-chamber 50 a reduced pressure by exhausting the air contained in said chamber through the pipe 60.

It is obvious that the invention is not limited to the embodiments which have been described and illustrated by way of example and it will not represent any departure from the scope thereof to incorporate modifications.

I claim:

1. A furnace for continuously producing glass comprising an upstanding insulated refractory-lined closed-top vertical shell defining a melting and refining chamber having an upper feeding portion, a degasifying portion and a glass materials melting and refining portion, gas-lock raw material feeding means mounted on said shell and extending into communication with the upper feeding portion of said chamber, means connected to said shell and extending into open communication with the upper degasifying portion of said chamber for reducing pressure therein below atmospheric and for degasifying the molten glass in said chamber, a molten glass withdrawal compartment laterally spaced from the bottom of said chamber and operatively connected thereto by an insulated duct extending therebetween, said withdrawal compartment being maintained at atmospheric pressure, and means positioned within said chamber for melting glass materials introduced therein at a temperature sufficient to effect melting but less than that normally required to effect refining of the molten glass in the absence of reduced pressure at the upper portion of said chamber, and means for maintaining the pressure differential between said withdrawal compartment and the upper portion of said chamber to maintain the level of molten glass within said chamber substantially higher than the level within said withdrawal compartment.

2. The furnace of claim 1 in which the material feeding means is positioned so that the raw material fed thereby falls freely through the upper portion of said chamber countercurrent to the hot gases arising from the molten glass therebelow.

References Cited

UNITED STATES PATENTS

| | | | |
|---|---|---|---|
| 3,019,275 | 1/1962 | Lorenz | 13—31 |
| 2,935,395 | 5/1960 | Smith | 13—31 |
| 3,078,326 | 2/1963 | Smith | 13—31 |
| 2,465,283 | 3/1949 | Schlehr | 65—335 XR |
| 2,877,280 | 3/1959 | Eden | 13—31 |
| 2,963,530 | 12/1960 | Hanks et al. | 13—31 |
| 1,598,308 | 8/1926 | Pike | 65—346 |

DONALL H. SYLVESTER, *Primary Examiner.*

F. W. MIGA, *Assistant Examiner.*

U.S. Cl. X.R.

65—337, 339, 346, 347, 157, 135, 137